United States Patent [19]

Tsuboi

[11] 3,947,740
[45] Mar. 30, 1976

[54] REGENERATIVE BRAKE CONTROL SYSTEM FOR DC MOTOR

[75] Inventor: Takashi Tsuboi, Katsuta, Japan

[73] Assignee: Hitachi, Ltd., Japan

[22] Filed: Oct. 10, 1974

[21] Appl. No.: 513,773

[30] Foreign Application Priority Data
Oct. 12, 1973 Japan............................ 48-113947

[52] U.S. Cl................................ 318/376; 318/380
[51] Int. Cl.² ........................................ H02P 3/12
[58] Field of Search ........... 318/269, 273, 341, 375, 318/376, 379, 380

[56] References Cited
UNITED STATES PATENTS

| | | |
|---|---|---|
| 3,525,027 | 8/1970 | Weiser ........................... 318/380 X |
| 3,577,055 | 5/1971 | Hermansson ..................... 318/380 X |
| 3,593,089 | 7/1971 | Appelo ........................... 318/380 X |

Primary Examiner—Robert K. Schaefer
Assistant Examiner—W. E. Duncanson, Jr.
Attorney, Agent, or Firm—Craig & Antonelli

[57] ABSTRACT

A regenerative brake control system for controlling an armature current of DC motor by on-off operation of a chopper through resistor means which is connected in series with the DC motor and is appropriately divided into sections is disclosed. In the system, the notching operation of the resistor means is controlled in such a manner that the duty cycle of the chopper immediately following the short-circuiting of one section of the resistor means is to be the minimum value tolerable to the chopper.

11 Claims, 15 Drawing Figures

REGENERATIVE BRAKE CONTROL SYSTEM FOR DC MOTOR

The present invention relates to a regenerative brake control system for a DC motor.

The DC motor control using a thyristor chopper is in wide commercial use in the fields including mainly electric railways. Especially, in the electric railways, not only powering but also regenerative brake control of electric cars is effected through a chopper in order to achieve an improved saving of electric power.

In the regenerative brake control of DC motor using a thyristor chopper, as will be described later, the armature current of the DC motor is compared with a reference value and the ON period of the chopper is regulated in such a manner as to maintain the armature current constant. In other words, when the armature current and the generated voltage is reduced by motor deceleration, the ON period of the chopper is automatically increased thereby to maintain the armature current constant. When further deceleration of the motor causes the ON period of the chopper to be increased up to a critical point where it is impossible to increase the ON period any more, one section of resistor means inserted in series with the motor is short-circuited thereby to increase the armature current. At the same time, the chopper is, on the other hand, controlled to decrease the ON period thereof so as to prevent an excessive armature current. By continued deceleration of the motor, resistor notching operation is repeated to short-circuit further section of the resistor means, finally resulting in the entire series resistor means being short-circuited.

In this way, some of the power generated by the motor at the time of braking is consumed by the resistor means and the remaining power is used for regenerative braking.

In the conventional regenerative brake control system of the above-mentioned type, a great amount of power is consumed by the resistor means, leading to low regenerative brake efficiency, as will be mentioned later, and also requiring resistor means with a large capacity.

An object of the present invention is to eliminate the above-described disadvantages of the prior art and provide a control system capable of regenerative braking with high efficiency.

According to one aspect of the invention, the regenerative brake control system for a DC motor comprises a DC motor, resistor means including at least one resistor section in series with the DC motor, switch means for short-circuiting the resistor seection of the resistor means, circuit means through which regenerative current is passed for regenerative braking by returning power generated by the DC motor to a power supply, chopper means, connected in parallel to the series-connection of the DC motor and the resistor means, for controlling the armature current by on-off operation thereof, means for regulating duty cycle of the chopper means, means for regulating the operation of the switch means in a manner so that the duty cycle immediately after the short-circuiting of the resistor section of the resistor means is to be at the minimum value tolerable to the chopper means.

The above and other objects, features and advantages will be made apparent by the detailed description taken in conjunction with the accompanying drawings, in which.

Figure 1:
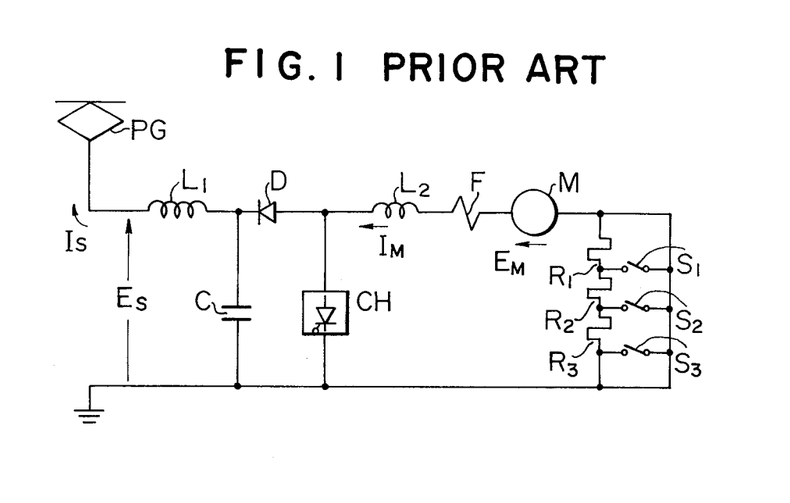
FIG. 1 is a diagram showing the fundamental circuit of a known DC motor regenerative braking system using a chopper.

Referring to FIG. 1 showing a typical circuit diagram of the regenerative braking control system for electric cars, a DC motor M, a field winding F and a smoothing reactor $L_2$ are connected in series thereby to control the armature current $I_M$ of the DC motor M by on-off operation of a chopper CH, so that current $I_S$ is returned to DC power supply through a diode D and a pantagraph PG during the OFF period of the chopper CH. In common practice, a filter comprising a reactor $L_1$ and a capacitor C is used to smooth the regenerative current.

In the arrangement of FIG. 1, resistor sections $R_1$ to $R_3$ are operatively inserted by opening switches $S_1$ to $S_3$ at the time of high motor speed when the voltage generated by the DC motor M exceeds the DC source voltage, so that the generated voltage less the voltage drop across the resistor sections is prevented from exceeding the source voltage. The resistor sections $R_1$ to $R_3$ are thus required to achieve stable control of regenerative braking current by the chopper CH.

To facilitate the understanding of the function and advantages of the invention, equations concerning the regenerative current, regenerative power and voltage balance for the known fundamental circuit of FIG. 1 will be described below.

Let the DC source voltage be $E_S$, the voltage generated by the motor $E_M$, the regenerative current returned to the power supply through the diode D and reactor $L_1$ be $I_S$, the aramture current or braking current be $I_M$, the duty cycle of the chopper CH be $\gamma$ and the total resistance of the motor circuit be R; then the following equations are obtained:

regenerative current: $I_S = I_M(1 - \gamma)$     (1)

regenerative power: $P_S = E_S \cdot I_M(1 - \gamma)$     (2)

where the duty cycle $\gamma$ means the ratio of the ON period of the chopper to one cycle of ON-OFF operation, that is, the sum of the ON period and OFF period.

In view of the fact that the voltage across the chopper CH is equal to $E_S$ during the OFF period of the chopper CH (on the assumption that the capacitance of the capacitor C is large enough) whereas the voltage across the chopper CH is 0 during the ON period thereof, it is apparent that the average voltage across the chopper CH is $E_S(1-\gamma)$. Therefore, voltage balance equation (3) is obtained as follows:

$$E_S(1-\gamma) = E_M - RI_M \qquad (3)$$

Figure 2:
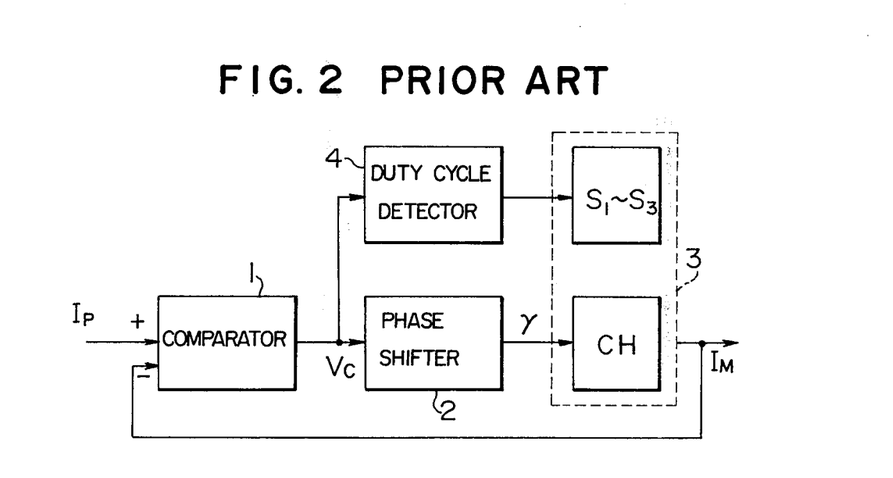
FIG. 2 is a block diagram showing a conventional regenerative braking control system.
Figure 3:
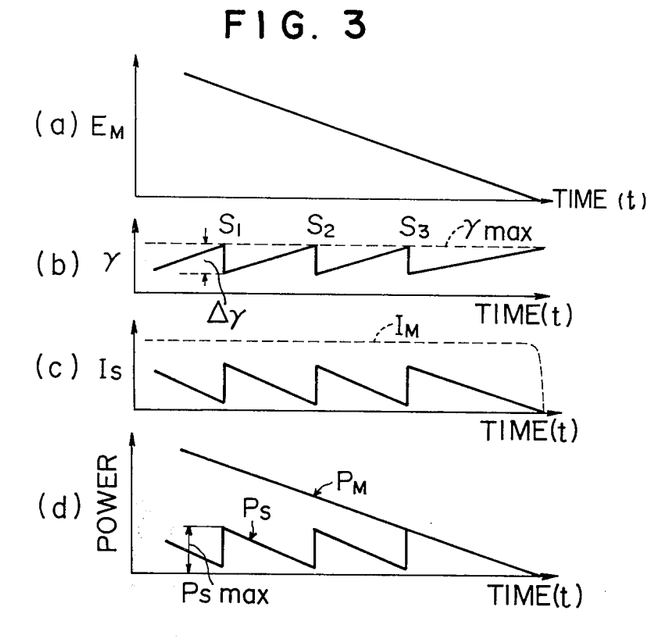
FIG. 3 is a diagram for explaining the operation of the conventional regenerative braking system.

Description will be made now of the control system according to the prior art. A block diagram of a typical conventional regenerative braking control system is shown in FIG. 2, and a diagram for explaining the operation thereof is shown in FIG. 3. The armature current $I_M$ is compared with a reference current value $I_P$ by a comparator 1 and an output $V_C$ corresponding to the difference therebetween is produced from the comparator 1. A phase shifter 2 is provided for determining the duty cycle $\gamma$ of the chopper CH in response to the output $V_C$. The current control system arranged as mentioned above functions in such a way that if the armature current $I_M$ is small as compared with the reference value $I_P$, the duty cycle $\gamma$, that is, the ON period of the chopper CH is enlarged thereby to increase the armature current $I_M$. As a result, when the generated voltage $E_M$ is reduced with the decrease in motor speed as shown in graph (a) of FIG. 3, the duty cycle $\gamma$ is automatically increased in the manner as shown in graph (b), thereby maintaining the armature current $I_M$ constant.

When the duty cycle $\gamma$ reaches the maximum value $\gamma_{max}$ where it is impossible to lengthen the ON period any more, it is detected by a duty cycle detector 4 thereby to close the switch $S_1$ included in the main circuit 3. Since the input $V_C$ of the phase shifter 2 is proportional to the duty cycle $\gamma$, the value $\gamma_{max}$ can be detected by monitoring the value $V_C$.

The short-circuiting of the switch $S_1$ causes the voltage drop $I_M \cdot R_1$ thus far present due to the resistor $R_1$ to be reduced to 0, with the result that the voltage balance expressed by the equation (3) is broken, thus leading to an upward tendency of the armature current $I_M$. At this time, the current control system operates again to automatically reduce the duty cycle $\gamma$ in such a manner that the armature current $I_M$ is equal to the reference value $I_P$. The same operation is subsequently repeated, thus closing the switches $S_2$ and $S_3$ in sequence. As a result, the duty cycle $\gamma$, regenerative current $I_S$ and regenerative power $P_S$ undergo changes as shown in graphs (b), (c) and (d) of FIG. 3.

As will be seen from the graph (d) of FIG. 3, if the amount of regenerative power is to be increased, it is required to maximize the value of $P_{Smax}$. Assuming now that the chopper is an ideal one, the amount of change $\Delta\gamma$ in duty cycle of the chopper is unity, and the equation (4) is obtained from the equation (2) as follows:

$$P_{Smax} = E_S \cdot I_M \qquad (4)$$

Figure 4:
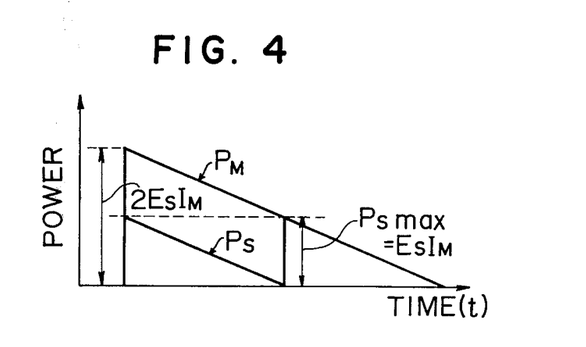
FIG. 4 shows power characteristics of the conventional regenerative braking system.

Assuming that brake is applied at a speed twice the rated speed while maintaining the current constant with the rated value, the generated voltage $E_M$ is reduced from about $2E_S$ down to 0. If $P_{Smax}$ as shown in the equation (4) is selected to maximize the regenerative power, only one notching step serves the purpose, resulting in the power characteristics as shown in FIG. 4. In other words, just half of the power generated by the motor is returned as a regenerative braking power.

Actually, however, variation in braking current ranges from 20% to 150% of the rated current and the source voltages $E_S$ undergoes continuous change between 40% and 120% of the rated voltage. Under this condition, if the change $\Delta\gamma$ in the duty cycle at the time of notching operation is to be set under unity, the resistor is required to be subdivided into two sections or more. Therefore $$P_{Smax} < E_S \cdot I_M \qquad (5)$$

The amount of regenerative power is thus reduced below half of the total amount of the power generated.

The less the regenerative power, the more power is required to be consumed by the resistor, resulting in reduced regenerative braking efficiency on the one hand and in the requirement for a large capacity of the resistor on the other hand.

The present invention is intended to obviate the aforementioned disadvantages of the conventional control system and the fundamental principle of the invention will be explained below with reference to equations.

Assume that the resistor R is reduced to $(R - \Delta R)$ in the equation (3), $\Delta R$ denoting the resistance of the resistor section short-circuited. The right side of the equation (3) is increased by $\Delta R \cdot I_M$. If the original current level $I_M$ is to be maintained even after the short-circuiting of the resistor section, the duty cycle $\gamma$ must be regulated in such a manner as to increase the left side of the equation (3) by the amount equivalent to $\Delta R \cdot I_M$. In other words, the duty cycle $\gamma$ is required to be reduced by $\Delta\gamma$ which is given by the relation $$E_S \cdot \Delta\gamma = \Delta R \cdot I_M \qquad (6)$$

Assume now that the following equation (7) is obtained when the duty cycle $\gamma$ is reduced by $\Delta\gamma$ from a value $\gamma_1$:

$$\gamma_1 - \Delta\gamma = \gamma_{min} \qquad (7)$$

where $\gamma_{min}$ denotes the minimum value of duty cycle $\gamma$ of the chopper CH.

Thus, the value $\gamma_1$ is given from the equations (6) and (7) as follows:

$$\gamma_1 = \gamma_{min} + (\Delta R/E_S) I_M \qquad (8)$$

The relation of equation (8) may be converted into the following equation related to voltage:

$$E_S \cdot \gamma_1 = E_S \cdot \gamma_{min} + \Delta R \cdot I_M$$

therefore $$E_S - E_S \cdot \gamma_1 = E_S - (E_S \cdot \gamma_{min} + \Delta R \cdot I_M)$$

therefore $$E_S(1-\gamma_1) = E_S(1-\gamma_{min}) - \Delta R \cdot I_M \qquad (9)$$

$E_S(1-\gamma_1)$ represents the average voltage $E_{CH1}$ across the chopper CH in the case when the value of duty cycle $\gamma$ is $\gamma_1$, and therefore the equation (9) is given as follows:

$$E_{CH1} = E_S(1-\gamma_{min}) - \Delta R \cdot I_M \qquad (10)$$

The system according to the invention operates on the fundamental principle that the resistor section is short-circuited when the duty cycle $\gamma$ reaches the value $\gamma_1$ satisfying the equation (8) or when the chopper voltage $E_{CH}$ becomes $E_{CH1}$ which satisfies the equation (10), as will be explained in detail below with reference to embodiments.

Figure 5:
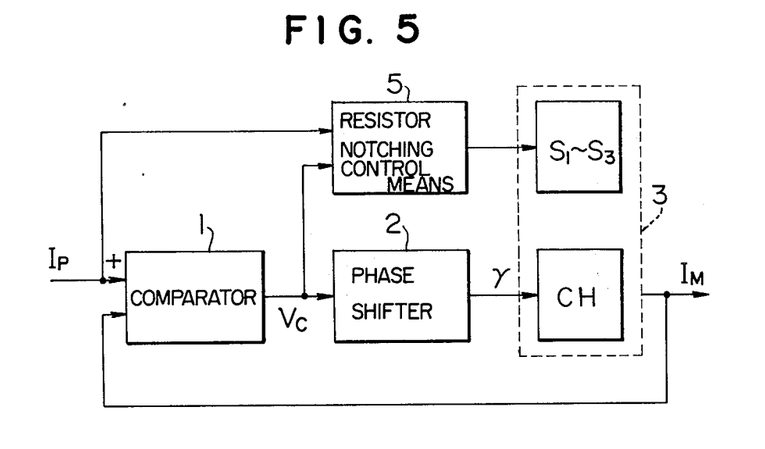
FIG. 5 is a block diagram showing an embodiment of the present invention.

In FIG. 5 showing a block diagram of an embodiment of the invention, the current control system comprising a comparator 1, a phase shifter 2 and a main circuit 3 is identical with the conventional one. Reference numeral 5 shows a resistor notching operation control means for sequentially closing resistor notching switches $S_1$ to $S_3$ in response to a current reference value $I_P$ and an input voltage $V_C$ to the phase shifter 2.

Figure 6:
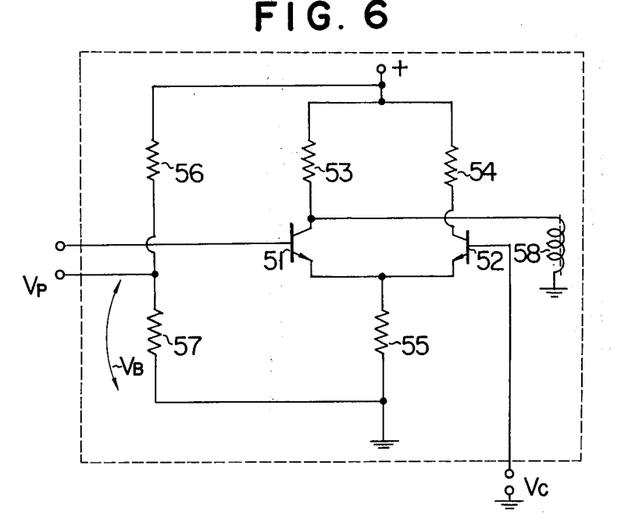
FIG. 6 is a circuit diagram showing the essential parts of the embodiment of FIG. 5.

A more detailed circuit diagram of the resistor notching operation control means of FIG. 5 is shown in FIG. 6. Transistors 51 and 52 and resistors 53 to 55 constitute a differential amplifier, by the use of which the exciting coil 58 of the switch $S_1$ is energized. The voltage $V_B$ obtained through the dividing resistors 56 and 57 is a bias voltage corresponding to $\gamma_{min}$ in the equation (8), and $V_P$ a reference voltage corresponding to $(\Delta R/E_S) \cdot I_P$. The current control system regulates the armature current $I_M$ in such a manner as to make it coincide with the reference $I_P$, with the result that the voltage $V_P$ assumes a reference voltage corresponding to $(\Delta R/E_S) \cdot I_M$ of the equation (8). Therefore, the sum of $V_P$ and $V_B$ is equivalent to the duty cycle $\gamma_1$ shown in the equation (8) to which the resistor is required to be notched. The input voltage $V_C$ to the phase shifter, on the other hand, corresponds to the duty cycle $\gamma$ of the chopper in operation.

Figure 7:
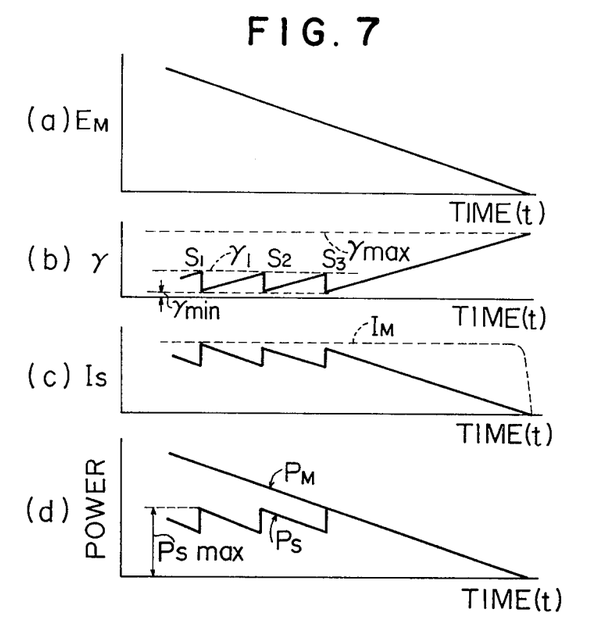
FIG. 7 is a diagram for explaining the operation of the control system according to the present invention.

The operating condition of the regenerative braking effected by the aforementioned system is shown in FIG. 7. As will be seen from graph (b) of FIG. 7, when the duty cycle $\gamma$ corresponding to $V_C$ increases and reaches $\gamma_1$ corresponding to $V_P + V_B$, the exciting coil 58 of the resistor notching operation control means 5 is energized thereby to close the switch $S_1$. As a result, the duty cycle $\gamma$ is reduced from $\gamma_1$ to $\gamma_{min}$, and after that it increases again as the motor M is decelerated with the resistor $R_1$ short-circuited. If the resistance of each resistor section is selected in such a way as to obtain $R_1 = R_2 = R_3 = \Delta R$, each section is notched at the same level, that is $\gamma = \gamma_1$, so that the regenerative current $I_S$ and regenerative power as shown in graphs (c) and (d) of FIG. 7 respectively are obtained, the graph (a) of FIG. 7 in illustrating the voltage generated by the motor.

According to this embodiment of the invention, the duty cycle $\gamma$ immediately following the notching operation is $\gamma_{min}$, and therefore the regenerative current $I_S$ is almost equal to the armature current $I_M$, thus permitting the regenerative current to be maximized. The maximum regenerative power immediately following the resistor notching operation is $$P_{Smax} = E_S \cdot I_M (1 - \gamma_{min}) \doteq E_S \cdot I_M \qquad (11)$$

which meets the ideal notching condition shown by the equation (4).

It is obvious from the equation (8) that the less the change $\Delta R$ in resistance the smaller the duty cycle $\gamma_1$ at the time point where a notching operation is required to be effected, with the result that there is less variation in the regenerative power, which further approximates $P_{Smax}$ in graph (d) of FIG. 7.

Explanation will be made below by referring to the above-mentioned case in which brake begins to be applied at twice the rated speed.

Figure 8:
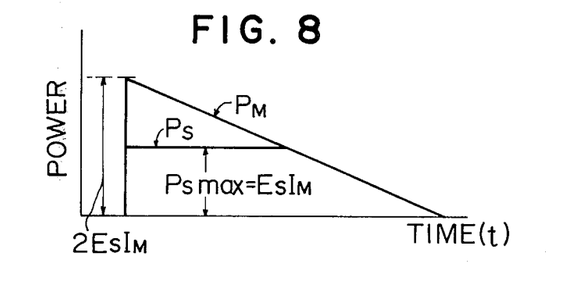
FIG. 8 shows power characteristics of the control system according the present invention.

In an ideal state where the number of the sections into which the resistor is divided is large enough and the resistance $\Delta R$ of each section is small enough, the relation between regenerative power and generated power is as shown in FIG. 8. In other words, three quarters of the amount of power generated by the motor is regenerated while a quarter of the same is consumed by the resistor. Thus, according to the invention, the amount of regenerative power generated upon brake application on the same condition is greatly increased as compared with the conventional system. Further, the capacity of the resistor can be reduced.

EVen though the aforementioned embodiment is concerned with the case in which, for the sake of simplicity, the resistance of each resistor section is equal, the present invention may be applied with equal effect to the case where the respective resistor sections are different in value from one another, by determining different values of duty cycle $\gamma_1$ as shown in graph (b) of FIG. 7 requiring a notching operation.

From the equation (8), the duty cycle $\gamma_1$ at the time point where a notching operation is to be performed varies with the source voltage $E_S$, so that the less the source voltage $E_S$, the higher the duty cycle $\gamma_1$. In the event that the variations in source voltage $E_S$ are small, a resistor notching control of practical value is made available by setting the value of $\gamma_1$ corresponding to the minimum source voltage. When the source voltage variation is great, on the other hand, it is impossible to obtain a regenerative power commensurate with the full capacity of the chopper at a high voltage level of the source voltage. In order that the power commensurate with the full ability of the chopper may be regenerated at a high voltage for the entire range of the source voltage, a circuit for compensating for variation in source voltage $E_S$ must be added to the resistor notching control means in such a way as to change the duty cycle $\gamma_1$ associated with the notching requirement in accordance with the source voltage $E_S$.

Figure 9:
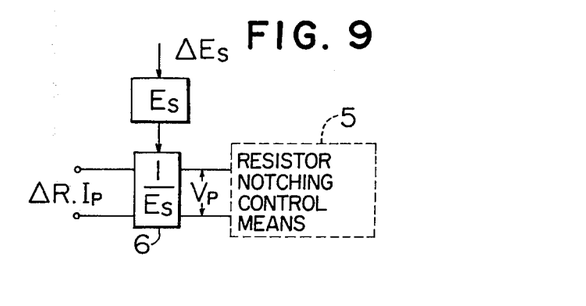
FIG. 9 is a block diagram showing another embodiment of the invention.

Referring to the block diagram of FIG. 9 showing means for compensating for the variations in source voltage $E_S$, a divider 6 operates such that the input voltage $\Delta R \cdot I_P$ proportional to the reference value $I_P$ is divided by the source voltage $E_S$ thereby to produce a reference value $V_P$. The use of this divider makes possible notching operation always at an optimum duty cycle against any variation in source voltage.

Instead of using the current reference values as an input to the resistor notching control means 5, the motor current $I_M$ may alternatively be detected directly to achieve the same purpose. Also, the method shown with reference to the foregoing embodiment in which the input to the phase shifter is employed as a factor corresponding to the duty cycle $\gamma$ may be replaced by another method in which the duty cycle is detected directly from the pulse width associated with the on-off operation or in which the voltage across the chopper is detected or the like.

Figure 10:
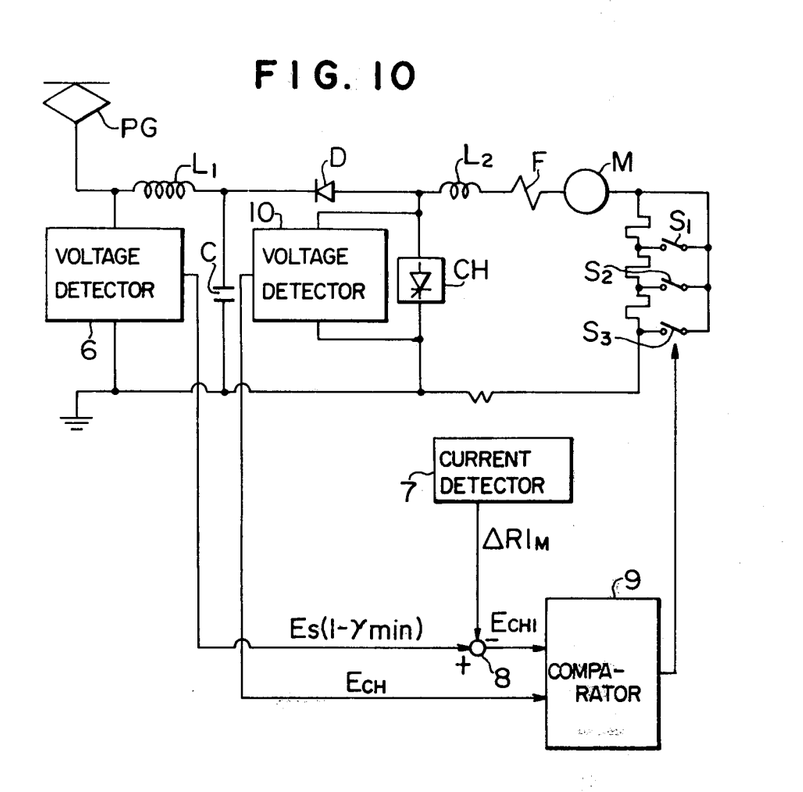
FIG. 10 is a circuit diagram showing still another embodiment of the invention.

The diagram of FIG. 10 shows another embodiment of the invention in which the resistor sections are short-circuited in accordance with the equation (10). In the drawing, only the main circuit and the resistor notching system are shown and the current control system is omitted. Reference numeral 6 shows a first voltage detector for detecting the source voltage $E_S$, which produces an output signal representing $E_S(1 - \gamma_{min})$. Numeral 7 shows an armature current detector for producing a signal corresponding to the voltage drop $\Delta R \cdot I_M$ of the resistance $\Delta R$ to be short-circuited. The outputs from the first voltage detector 6 and the armature current detector 7 are applied to a subtractor means 8, and after being converted into $E_{CH1} = E_S(1 - \gamma_{min}) - \Delta R \cdot I_M$, applied to a comparator 9. The voltage across the chopper CH, on the other hand, is detected by a second voltage detector 10 and compared with the voltage $E_{CH1}$ by the comparator 9.

Figure 11:
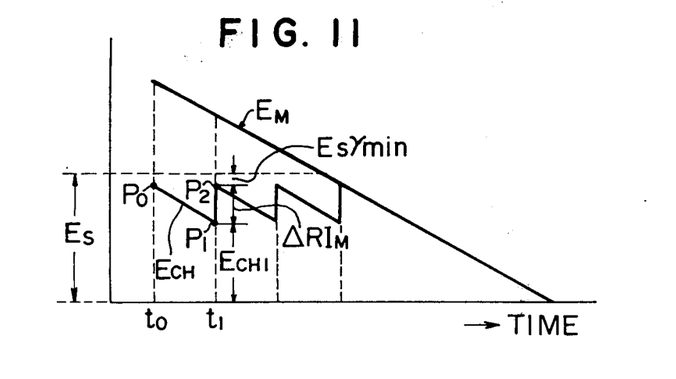
FIG. 11 is a diagram for explaining the operation of the embodiment of FIG. 10.

Referring to FIG. 11 showing a graph for explaining the operation of the system of FIG. 10, the manner in which the chopper voltage $E_{CH}$ changes is illustrated. In other words, at the time point when regenerative brake begins with the full resistor inserted at the maximum motor speed, the chopper voltage $E_{CH}$ is at the point $P_0$, so that the difference between the motor voltage $E_M$ and the chopper voltage $E_{CH}$ is born by the resistor sections $R_1$, $R_2$ and $R_3$.

With the decrease in vehicle speed, the voltage generated is also reduced, and therefore in order to maintain a required motor current, the current control system increases the duty cycle $\gamma$ of the chopper, thereby reducing the voltage $E_{CH}$ across the chopper CH.

When the voltage $E_{CH}$ reaches the point $P_1$, the voltage comparator 9 detects that $$E_{CH} < E_{CH1} = E_S(1 - \gamma_{min}) - \Delta R \cdot I_M \tag{12}$$

and short-circuits the appropriate resistor sections. As a result, the armature current $I_M$ tends to increase. This upward tendency of the armature current $I_M$, however, is dampened by the repeated energization of the current control system whereby the duty cycle $\gamma$ is automatically increased thereby to maintain the armature current $I_M$ constant. At this time, the voltage $E_{CH}$ across the chopper CH transfers from point $P_1$ to $P_2$ in such a manner as to just compensate for the voltage drop $\Delta R \cdot I_M$ due to the short-circuited resistor sections. Under this condition, the relation as shown in the equation (12) is present and therefore the chopper voltage $E_{CH}$ increases up to the maximum value $E_S(1 - \gamma_{min})$ controllable by the chopper, with the result that the power $P_S$, that is, $I_M \cdot E_{CH}$ regenerated to the power supply reaches its maximum.

Differing from the first embodiment, the second embodiment mentioned above has an advantage that the voltage $E_{CH1}$ varies with the source voltage $E_S$ and therefore there is no need for any means for compensating for the variations in source voltage, thus permitting the appropriate resistor sections to be short-circuited under the optimum condition always.

Figure 12:
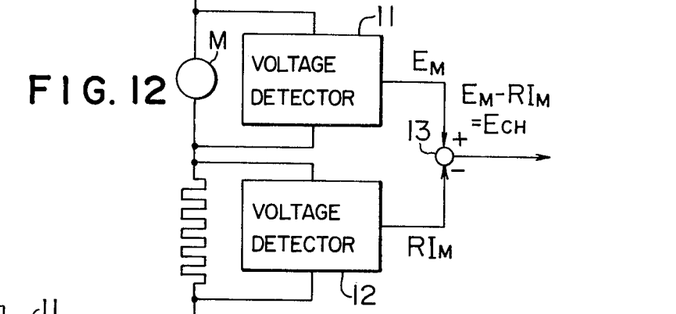
FIGS. 12 and 13 are partial circuit diagrams showing modifications of the embodiment of FIG. 10.
Figure 13:
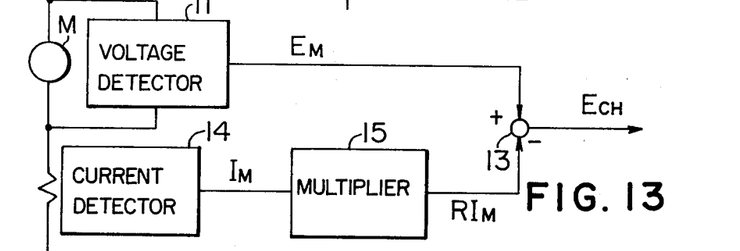

In spite of the second embodiment in which the voltage across the chopper CH is detected directly, the relation $E_{CH} = E_M - R \cdot I_M$ permits the employment of an alternative method by which the chopper voltage $E_{CH}$ is detected indirectly by detecting the motor voltage $E_M$ and armature current $I_M$. Such an alternative method is shown in the embodiments of FIGS. 12 and 13. In the embodiment shown in FIG. 12, the motor voltage $E_M$ is detected by the voltage detector 11 while the voltage drop $R \cdot I_M$ across the resistor R is detected by another voltage detector 12 and subtracted by subtractor means 13, thus producing the chopper voltage $E_{CH} = E_M - R \cdot I_M$.

The embodiment of FIG. 13 is the same as that of FIG. 12 in that the motor voltage $E_M$ is detected by the voltage detector 11, but different in that in the embodiment of FIG. 13 the armature current $I_M$ is detected by a current detector 14 and the result of detection is multipled by the resistance R by the multiplier 15, so that the difference between the obtained voltage drop $R \cdot I_M$ and the voltage $E_M$ is produced by the subtractor means 13.

Figure 14:
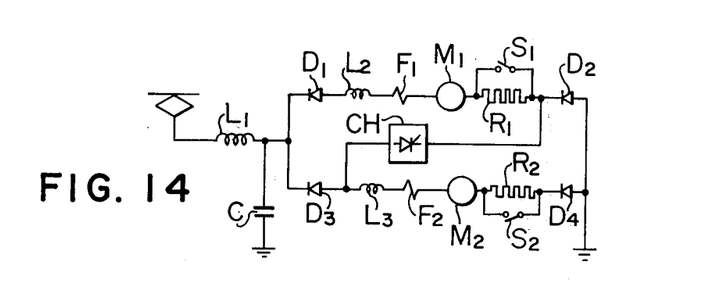
FIGS. 14 and 15 are circuit diagrams showing modifications of the regenerative braking system to which the present invention is applicable.
Figure 15:
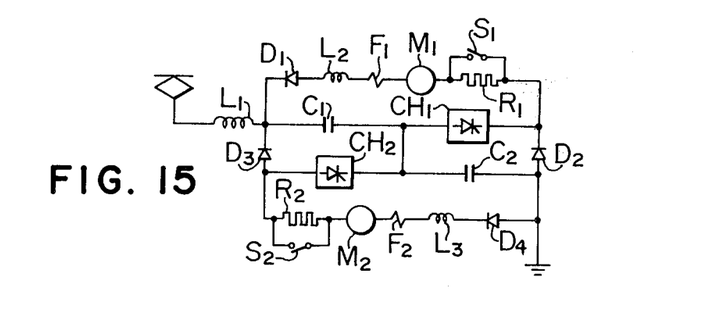

The regenerative braking circuits so far suggested include various modifications of FIG. 1. For example, each of the circuits shown in FIG. 14 and FIG. 15 is a regenerative braking system for controlling a plurality of motors $M_1$ and $M_2$. In the drawings, reference symbols $R_1$ and $R_2$ show resistors, $S_1$ and $S_2$ switches for short-circuiting the resistors, symbols $F_1$ and $F_2$ field windings, symbols CH, $CH_1$ and $CH_2$ choppers, symbols C, $C_1$ and $C_2$ capacitors, symbols $D_1$, $D_2$, $D_3$ and $D_4$ diodes, and symbols $L_1$, $L_2$ and $L_3$ smoothing reactors. So far as the regenerative braking is regulated by on-off operation of chopper means, it is apparent that the present invention is applicable with equal effect to these modifications as well.

It will thus be seen that the objects set fourth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

What is claimed is:

1. A regenerative brake control system for a DC motor comprising: a DC motor; resistor means connected in series with said DC motor and including at least one resistor section; switch means for short-circuiting said resistor section of said resistor means; circuit means through which regenerative current is passed for regenerative braking by returning power generated by said DC motor to a power supply; chopper means, connected in parallel to a series circuit of said DC motor and said resistor means, for controlling the armature current of said DC motor by on-off operation thereof; means for controlling the duty cycle of said chopper means; and means for controlling the operation of said switch means in a manner so that the duty cycle immediately following the short-circuiting of said resistor section of said resistor means is a minimum value tolerable to said chopper means.

2. A regenerative brake control system according to claim 1, in which said means for controlling the operation of said switch means includes means for detecting the fact that the duty cycle of said chopper means reaches a certain value which indicates a proper timing to short-circuit said resistor section so that the duty cycle immediately following the short-circuiting of said resistor section is controlled to be said minimum value tolerable to said chopper means; and means for energizing said switch means in response to the operation of said detector means.

3. A regenerative brake control system according to claim 2, in which said duty cycle control means includes comparator means for comparing the armature current of said DC motor with a reference value so that the armature current is maintained constant by controlling said duty cycle depending on the deviation of the armature current from said reference value.

4. A regenerative brake control system according to claim 3, in which said detector means detects the fact that the duty cycle of said chopper reaches said certain value in response to the output of said comparator and said reference value.

5. A regenerative brake control system according to claim 4, in which said detector means includes a differential amplifier, said differential amplifier having a first input terminal to which an electrical signal corresponding to said reference value is applied, said differential amplifier having a second input terminal to which an electrical signal representing said deviation is applied, said means for energizing said switch means being energized in response to the output from said differential amplifier.

6. A regenerative brake control system according to claim 5, in which said resistor means includes a plurality of resistor sections, and said means for energizing said switch means includes resistor notching means for notching said sections of said resistor means in response to the output signal from said differential amplifier.

7. A regenerative brake control system according to claim 2, in which said detector means includes means for compensating for variations in source voltage so as to properly detect the fact that the duty cycle of said chopper means reaches said certain value.

8. A regenerative brake control system according to claim 5, in which said detector means includes means for compensating for variations in source voltage so as to properly detects the fact that the duty cycle of said chopper means reaches said certain value.

9. A regenerative brake control system according to claim 8, in which said compensating means includes divider means, said electrical signal representing said reference value being applied to said first input terminal after being divided by the source voltage.

10. A regenerative brake control system according to claim 1, in which said means for controlling the operation of said switch means includes first means for detecting a voltage of said power supply, second means for detecting a voltage across said chopper means, third means for detecting the armature current of said DC motor, and means for determining, in response to the respective outputs from said first, second and third means, a proper timing to short-circuit said resistor section so that the duty cycle immediately following the short-circuiting of said resistor section is controlled to be said minimum value tolerable to said chopper means.

11. A regenerative brake control system according to claim 10; in which said first voltage detector means detects the voltage $E_S$ of said power supply to produce an output representing $E_S(1 - \gamma_{min})$, where $\gamma_{min}$ is said minimum duty cycle value tolerable to said chopper means; said third means detecting the armature current $I_M$ and producing an output corresponding to the voltage drop $\Delta R \cdot I_M$ across the resistor section $\Delta R$ to be short-circuited; said switch control means including subtractor means for subtracting the output of said armature current detector means from the output of said first voltage detector means, and comparator means for comparing the result of subtraction by said subtractor means with the chopper voltage $E_{CH}$ detected by said second voltage detector means; said switch means being energized to short-circuit said resistor section $\Delta R$ at the time point when the condition $E_{CH} < E_S(1 - \gamma_{min}) - \Delta R \cdot I_M$ is satisfied.

* * * * *